(12) United States Patent
Lhermite

(10) Patent No.: US 7,986,536 B2
(45) Date of Patent: Jul. 26, 2011

(54) METHOD OF FORMING A POWER SUPPLY CONTROLLER AND STRUCTURE THEREFOR

(75) Inventor: Francois Lhermite, Lasserre (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 894 days.

(21) Appl. No.: 11/917,327

(22) PCT Filed: Mar. 19, 2007

(86) PCT No.: PCT/US2007/064263
§ 371 (c)(1),
(2), (4) Date: Dec. 12, 2007

(87) PCT Pub. No.: WO2008/115231
PCT Pub. Date: Sep. 25, 2008

(65) Prior Publication Data
US 2009/0303757 A1    Dec. 10, 2009

(51) Int. Cl.
*H02M 3/335* (2006.01)
(52) U.S. Cl. ...................... 363/21.12; 363/41
(58) Field of Classification Search ............ 363/16–20, 363/41, 49, 21.01, 21.08, 21.12–21.18, 37; 323/205, 207, 906; 307/37, 46, 66; 320/53, 320/64, 101, 104
See application file for complete search history.

(56) References Cited

U.S. PATENT DOCUMENTS

| 4,695,784 A * | 9/1987 | Reynolds ................. 320/143 |
| 7,102,899 B2 * | 9/2006 | Reinhard et al. ........... 363/21.01 |
| 7,616,459 B2 * | 11/2009 | Huynh et al. .............. 363/21.12 |

* cited by examiner

*Primary Examiner* — Rajnikant Patel
(74) *Attorney, Agent, or Firm* — Robert F. Hightower

(57) ABSTRACT

In one embodiment, a switching controller uses an auxiliary winding voltage of a transformer to form a signal representative of current flow through a secondary winding of the transformer.

20 Claims, 3 Drawing Sheets

10

# US 7,986,536 B2

METHOD OF FORMING A POWER SUPPLY CONTROLLER AND STRUCTURE THEREFOR

BACKGROUND OF THE INVENTION

The present invention relates, in general, to electronics, and more particularly, to methods of forming semiconductor devices and structure.

In the past, various configurations were used to form power supply controllers that controlled an output voltage on a secondary side of transformer by controlling current flow through a primary side of the transformer. In some cases, and optical coupler was utilized to sense the value of the output voltage and form a feedback signal that was used to control the current through the primary side. However, this added cost to the system. In other cases, the transformer included an auxiliary winding into which a voltage was induced from the primary side of the transformer. The signals on the auxiliary winding were used to control a power supply controller connected to the primary side of the transformer. One such control circuit is disclosed in U.S. Pat. No. 7,102,899 issued to Reinhard et al on Sep. 5, 2006. One problem with these prior circuits was the accuracy of the regulation of the output voltage when using the auxiliary winding as a control signal. Typically, the accuracy was less than approximately ten percent.

Accordingly, it is desirable to have a control method that reduces the system cost, that does not utilize an optical coupler to form a feedback signal, and that has improved accuracy.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action. The use of the word substantially means that a value of element has a parameter that is expected to be very close to a stated value or position. However, as is well known in the art there are always minor variances that prevent the values or positions from being exactly as stated. It is well established in the art that variances of up to about ten percent (10%) are regarded as reasonable variances from the ideal goal of exactly as described.

DETAILED DESCRIPTION OF THE DRAWINGS

Figure 1:
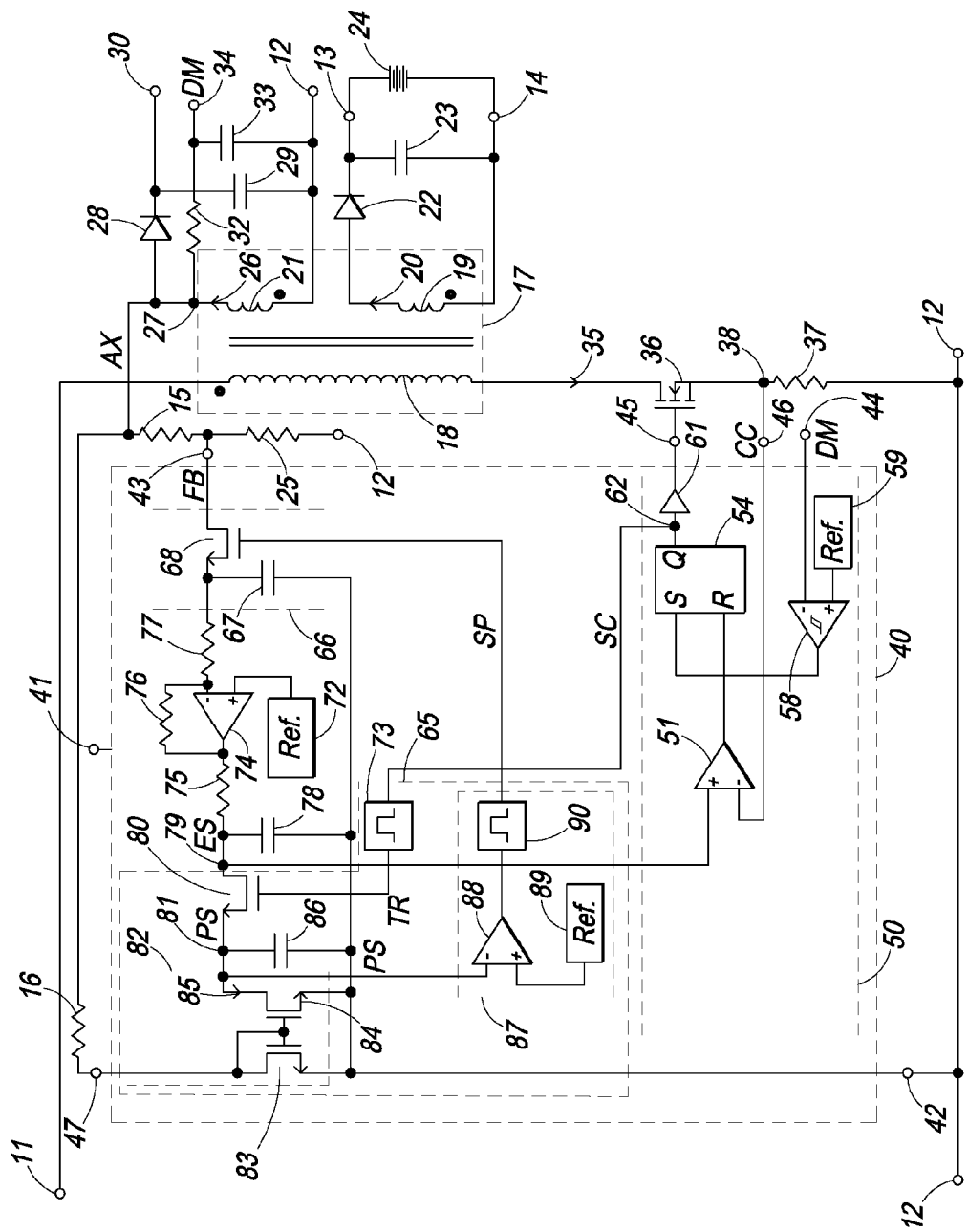
FIG. 1 schematically illustrates an embodiment of a portion of a power supply system in accordance with the present invention.

FIG. 1 schematically illustrates an exemplary form of an embodiment of a portion of a power supply system 10 that is connected in a quasi-resonant flyback configuration. System 10 receives power, such as a DC voltage, between a power input 11 and a power return 12 and forms a regulated output voltage that is used for various applications such as to charge a battery 24. A transformer 17 of system 10 has a primary side inductor or winding 18, a secondary side inductor or winding 19, and an auxiliary inductor or auxiliary winding 21. Secondary winding 19 is utilized to form the regulated output voltage between an output 13 and an output return 14. A load current or secondary current 20 flows through winding 19. A rectifier diode 22 and a capacitor 23 are used to rectify the voltages formed by winding 19 and form a substantially DC output voltage. A switching power supply controller 40 of system 10 is utilized to control the switching of a power switch such as a transistor 36 in order to regulate the value of the output voltage between output 13 and return 14. A current sense resistor 37 is connected to receive a current 35 from transistor 36 and form a current control (CC) signal on a node 38 that is utilized to limit the value of current 35 through inductor 18.

The switching of transistor 36 induces an auxiliary (AX) voltage on a terminal 27 of winding 21 and induces an auxiliary current 26 that flows through winding 21. A diode 28 and a capacitor 29 are connected to receive the AX voltage and form an operating voltage between a power terminal 30 and return 12 that is utilized for operating controller 40. A resistor 32 and a capacitor 33 receive the auxiliary (AX) voltage from terminal 27 and form a demagnetization or Dmag (DM) signal on an output 34. The value and waveshape of the Dmag (DM) signal is substantially equal to the waveshape and value of the voltage across winding 21 but is delayed in time by the time constant of resistor 32 and capacitor 33.

Since all windings of transformer 17 are magnetically coupled together, windings 19 and 21 each produce a voltage identical to each other in shape but with a value that is proportional to their respective number of turns. So, regulating the voltage on winding 21 results in regulating the voltage on the winding 19. The effective output voltage is equal to the voltage developed on winding 19 minus the forward voltage drop of diode 22. Consequently, system 10 regulates the value of the output voltage to a target value within a range of values around the target value. For example, the target value may be ten volts (10 V) and the range of values may be plus or minus five percent (5%) around the five volts.

Controller 40 is connected into the primary side of system 10 and the voltages of controller 40 are referenced to the primary side. In order to determine the value of and regulate the output voltage, switching controller 40 is configured to receive the auxiliary (AX) voltage from auxiliary winding 21 and generate a pseudo current sense (PS) signal at a node 81 that is representative of the value and waveshape of current 20. The pseudo current sense (PS) signal is utilized to control a time at which controller 40 samples the value of the auxiliary voltage and determines the value of the output voltage. In addition, the sampled value of the auxiliary voltage is utilized to form an error signal (ES) that assist controller 40 in regulating the value of the output voltage. The error signal (ES) is also used to form the pseudo current sense (PS) signal. Generating the PS signal allows controller 40 to regulate the output voltage without being directly connected to or electrically referenced to secondary winding 19.

Controller 40 is connected to receive power from terminal 30 and return 12 through a voltage input 41 and a voltage return 42. Input 41 and return 42 are typically connected to terminal 30 and return 12, respectively. Controller 40 also includes a feedback (FB) input 43 that is connected to receive the auxiliary (AX) voltage, an output 45 that is connected to control transistor 36, a current control (CC) input 46, a Dmag (DM) input 44, and a sense input 47. Input 44 generally is connected to Demag (DM) output 34 in order to receive the DM signal. Input 47 is connected to receive the AX voltage through an external resistor 16.

A switching control section 50 of controller 40 includes a comparator 51, a switching control latch 54, a buffer driver or buffer 61, a hysteresis comparator 58, and a reference voltage generator or reference or ref 59. A signal processing section of controller 40 includes an auxiliary (AX) sampling circuit 66, a pseudo signal generator circuit 65, and an error amplifier 74 that includes feedback and gain control resistors 76 and 77 in addition to frequency compensation components that include a resistor 75 and a capacitor 78. Resistor 75 and capacitor 78 form a pole that is used to stabilize the operation of system 10. A reference generator circuit or ref 72 provides a reference voltage for amplifier 74. AX sampling circuit 66 includes a sampling switch such as a transistor 68, and a storage element such as a capacitor 67. Pseudo signal generator circuit 65 includes a sampling switch such as a transistor 80, a second storage element such as a capacitor 86, a decay matching circuit 82, a negative edge detector 73, and a zero crossing detection circuit or zero crossing detector or ZCD 87. ZCD 87 includes a comparator 88, a reference generator or ref 89, and a positive edge detection circuit or edge detector 90. Decay matching circuit 82 includes a current a current mirror formed by current mirror connected transistors 83 and 84. External current shaping resistor 16 assists in the operation of circuit 82. Elements of controller 40, such as switching control section 50, amplifier 74, ZCD 87, and circuit 65, usually are connected to receive operating power between input 41 and return 42.

Figure 2:
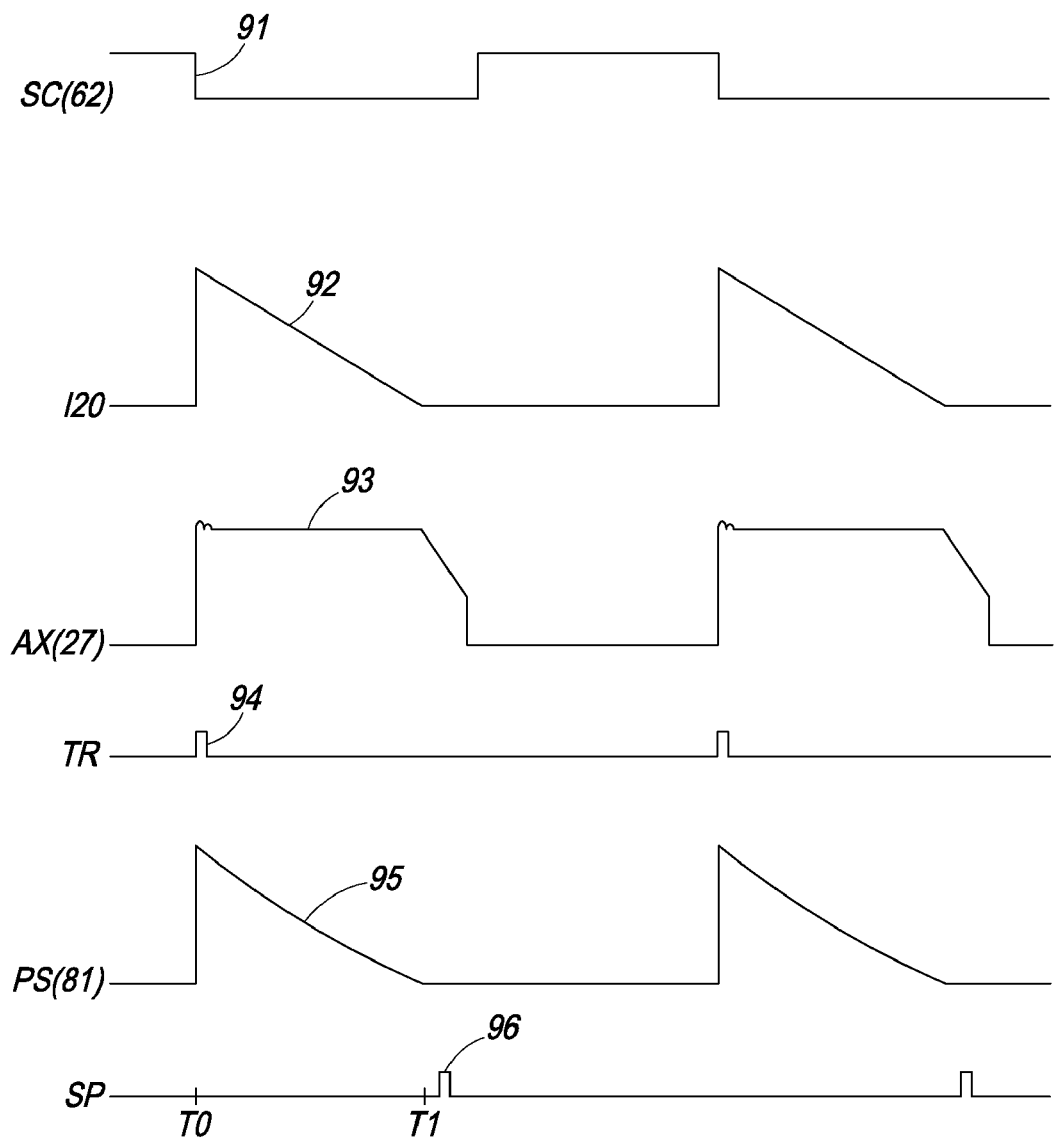
FIG. 2 is a graph that graphically illustrates some of the signals of the system of FIG. 1 in accordance with the present invention.

FIG. 2 is a graph having plots that graphically illustrate of some of the signals of system 10. The abscissa indicates time and the ordinate indicates increasing value of the illustrated signal. A plot 91 illustrates the switching control (SC) signal on node 62. A plot 92 illustrates current 20 through secondary winding 19. A plot 93 illustrates the AX voltage on terminal 27. A plot 94 illustrates a transfer (TR) signal on the output of edge detector 73. A plot 95 illustrates the PS signal on node 81, and a plot 96 illustrates a sampling signal (SP) on the output of edge detector 90. This description has references to FIG. 1 and FIG. 2.

In operation, because load current 20 flows through diode 22, the voltage drop across diode 22 causes the output voltage to be dependent on the value of current 20. Consequently, the auxiliary voltage and the DM signal are different from the output voltage by the value of the voltage across diode 22. For large values of current 20, the drop across diode 22 is also large, and as the value of current 20 decreases, the forward drop across diode 22 also decreases. At the point that current 20 in diode 22 reaches substantially zero, the forward drop across diode 22 is at a minimum forward voltage of diode 22 and the voltage across diode 22 becomes substantially constant at the minimum forward drop of diode 22. At that point, the value of the AX voltage is representative of the output voltage plus the constant value of the forward drop across diode 22. Thus, the value of the AX voltage can be used as a feedback signal to represent the output voltage. Controller 40 uses the sampling (SP) signal to sample the AX voltage and form a sampled signal on capacitor 67 when the value of current 26 is substantially zero. Since the AX voltage is proportional to the voltage on winding 19 and has the same waveshape, the AX voltage is sampled when current 20 is substantially zero. The sampled signal is representative of the value of the auxiliary (AX) voltage, thus the output voltage, when the value of current 20 is substantially zero. Error amplifier 74 uses the sampled value from capacitor 67 to form an error signal (ES) that is representative of a deviation between the value of the output voltage and a desired value of the output voltage. Switching control section 50 uses the ES signal to form the switching control (SC) signal and control transistor 36. Pseudo signal generator circuit 65 stores a value of the error (ES) signal on capacitor 86 when the switching control signal (SC) goes low to disable transistor 36. Decay circuit 82 discharges capacitor 86 at a rate that is substantially equal to the rate at which current 20 decays so the value and waveshape of the PS signal is proportional to the value and waveshape of current 20.

While the switching control (SC) signal is high to enable transistor 36, current 35 flows through inductor 18. Assume for purposes of explanation that capacitor 67 previously stored a value that is proportional to the value of the AX voltage. Error amplifier 74 receives the stored value and forms the error signal (ES) that is representative of the deviation between the output voltage and the desired value of the output voltage. The value of the ES signal is stored on capacitor 78. Section 50 compares the ES signal to the CC signal to determine the proper value of current 35 at which to disable transistor 36. At some point, the value of the ES and CC signals cross and the output of comparator 51 goes high to reset latch 54. The low from latch 54 forces the SC signal low to begin disabling transistor 36 and inhibit current 35 as illustrated by plot 91 at a time T0. The change in current 35 induces current 20 to flow through secondary winding 19 and current 26 to flow through auxiliary winding 21 as illustrated by plot 92 at time T0. The change in current 35 also induces a secondary voltage across winding 19. Diode 22 and capacitor 23 rectify and filter the secondary voltage to form the output voltage between output 13 and return 14. The change in current 35 also induces the auxiliary (AX) voltage between terminal 27 and return 12 as illustrated by plot 93. Diode 28 and capacitor 29 rectify and filter the auxiliary voltage to form the operating voltage on terminal 30. Resistor 32 and capacitor 33 receive the auxiliary voltage and form the Demag (DM) signal between output 34 and return 12.

The auxiliary (AX) voltage is also applied across the resistance of resistor 16 and the on-resistance of transistor 83 which forms a current flowing through transistor 83. Typically, the value of resistor 16 is much higher than the on-resistance of transistor 83 so that resistor 16 and the value of the auxiliary voltage determine the value of the current flowing through transistor 83. Transistors 83 and 84 are connected in a current mirror configuration so that the value of current 85 through transistor 84 is ratioed to the value of the current through transistor 83 by the size ratio between transistors 83 and 84. Thus, current 85 through transistor 84 is representative of the AX voltage. Current 85 is utilized to discharge the voltage stored on capacitor 86. Because current 85 is representative of the AX voltage, the pseudo signal (PS) formed at a node 81 is representative of the value and waveshape of current 20. Since the PS signal is proportional to current 20, the pseudo (PS) signal reaches zero at substantially the same time that current 20 reaches zero as illustrated by plots 92 and 95 at a time T1. When the PS signal reaches zero the output of zero crossing detector 87 goes high. Edge detector 90 detects the rising edge from comparator 88 and forms a narrow pulse that enables transistor 68 to store on capacitor 67 a feedback (FB) signal that is representative of the auxiliary (AX) voltage, thus, representative of the output voltage. The FB signal is formed by a voltage divider configured by resistors 15 and 25. Error amplifier 74 uses the sampled signal on capacitor 67 to form the ES signal. The pulse from edge detector 90 is just wide enough to enable transistor 68 for a time sufficient to charge capacitor 67 to the value of the FB signal.

Subsequently, when the value of the Dmag (DM) signal decreases to a value less than the value of reference 59, the output of comparator 58 goes high to set latch 54 and force the switching control (SC) signal high again. The high SC signal enables transistor 36 and causes current 35 to once again flow through inductor 18. Transistor 36 remains enabled until the ES signal crosses the value of the CS signal which again resets latch 54. The low going signal from latch 54 causes edge detector 73 to form a short pulse which again briefly enables transistor 80 to transfer the signal stored on capacitor 78 to capacitor 86.

The relationship between the pseudo (PS) signal and current 20 is shown by the following equations:

$$I20=(I35_{peak})/Np)-(((VO+VF)/LS)*Toff)$$

where;
- I20—value of current 20,
- $I35_{peak}$—peak value of current 35,
- Np=N20/N18—turns ratio of winding 20 divided by winding 18,
- VO—the value of the output voltage,
- VF—the forward voltage across diode 22,
- LS—inductance of winding 19, and
- Toff—the time required for current 20 to become zero.

When transistor 36 is turned off by controller 40, the value of the error signal (ES) and the value of the current control (CS) signal on input 46 are equal as shown below:

$$Ves=Vcc=R37*I35_{peak}$$

where;
- Ves—the value of the error signal ES,
- Vcc—the value of the current control signal CC on input 46, and
- R37—the value of resistor 37.

Solving the Ves equation for I35 and substituting it into the equation for I20 results in;

$$I20=((Ves/(R37*Np))-(((VO+VF)/LS)*Toff)$$

When transistor 36 turns off, the AX voltage increases to a peak as illustrated at time T0. At time T0 the voltage across diode 22 is at a maximum value as illustrated by plot 93. As current 20 decreases, the voltage across diode 22 decreases. The AX voltage does not have the variation caused by diode 22 so the AX voltage begins at a higher value than the voltage across winding 19. Since current 85 is formed from the AX voltage the voltage stored on capacitor 86 begins decaying according to:

$$PS=Ves-(I85/C86)*T$$

Current 85 can be expressed as:

$$I85=Vax/R16*SR83$$

and Vax can be expressed as:

$$Vax=(N_2)(VO+VF)$$

where;
- PS—the value of the PS signal,
- I85—the value of current 85 through transistor 84,
- C86—the value of capacitor 86,
- T—the time to discharge capacitor C86,
- Vax—the value of the AX voltage on terminal 27,
- SR83—the size ratio between transistors 83 and 84, and
- N2—the turns ratio between windings 19 and 21 (N19/N21).

Substituting the equation for Vax into the equation for I85 and substituting the equation for I85 into the equation for PS yields;

$$PS=Ves-((N2(VO+VF))/(R16*C86)).$$

Solving the above equation of PS and the equation of I19 for the common term Ves and setting the equations equal to each other yields;

$$((R37*Np)/(R16*C86))=(1/L19)$$

Solving the above for the external components that are selected to control the PS signal yields;

$$R16*C86=R37*Np*L19$$

Generally, the values of the turns ratio and the inductance of transformer 17 are difficult to select. Thus, the value of capacitor 86 and the value of resistors 16 and 37 can be selected to provide the desired behavior for the PS signal. In the preferred embodiment, controller 40 is formed on a semiconductor die and capacitor 86 is formed on the same semiconductor die. In this preferred embodiment, the value of resistors 16 and 37 can be selected to make the above equation balance and control the operation of system 10 to make the value and the waveshape of the PS signal substantially proportional to the value and waveshape of current 20. This results in controller 40 using the value of the output voltage at substantially the zero crossing of current 20 in order to regulate the value of the output voltage.

A first terminal of resistor 15 is commonly connected to terminal 27 of winding 21 and a first terminal of resistor 16. A second terminal of resistor 16 is connected input 47. Input 47 is commonly connected to a drain and a gate of transistor 83 and a gate of transistor 84. A source of transistor 83 is commonly connected to a source of transistor 84 and to return 42. A drain of transistor 84 is commonly connected to node 81, an inverting input of comparator 88, a first terminal of capacitor 86, and a source of transistor 80. A second terminal of capacitor 86 is connected to return 42. A drain of transistor 80 is commonly connected to node 79, a non-inverting input of comparator 51, a first terminal of capacitor 78, and a first terminal of resistor 75. A second terminal of capacitor 78 is connected to return 42. A second terminal of resistor 75 is commonly connected to an output of amplifier 74 and a first terminal of resistor 76. A second terminal of resistor 76 is commonly connected to a first terminal of resistor 77 and an inverting input of amplifier 74. The non-inverting input of amplifier 74 is connected to the output of Ref 72. A second terminal of resistor 77 is commonly connected to a first terminal of capacitor 67 and a source of transistor 68. A second terminal of capacitor 67 is connected to return 42. A drain of transistor 68 is connected to input 43. A gate of transistor 68 is connected to the output of edge detector 90. An input of edge detector 90 is connected to the output of comparator 88. A non-inverting input of comparator 88 is connected to the output of ref 89. A gate of transistor 80 is connected to the output of edge detector 73 which has an input commonly connected to the Q output of latch 54 and an input of buffer 61. An output of buffer 61 is connected output 45. A set input of latch 54 is connected to the output of comparator 58. An inverting input of comparator 58 is connected to input 46 and a non-inverting input of comparator 58 is connected to the output of ref 59. A reset input of latch 54 is connected to the output of comparator 51. An inverting input of comparator 51 is connected to input 46. Input 43 of controller 40 is commonly connected to a first terminal of resistor 15 and a first terminal of resistor 25. A second terminal of resistor 25 is connected to return 12. A second terminal of resistor 15 is connected to terminal 27 of winding 21.

Figure 3:
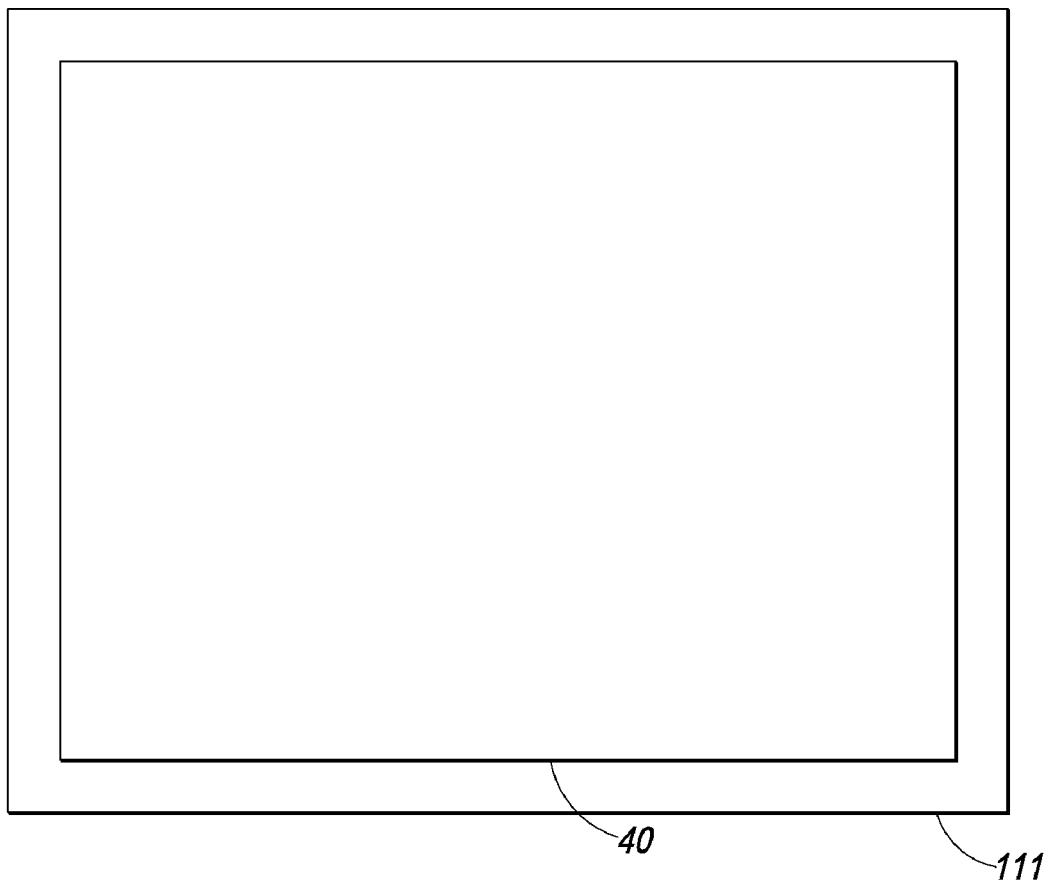
FIG. 3 schematically illustrates an enlarged plan view of a semiconductor device that includes a portion of the power supply system of FIG. 1 in accordance with the present invention.

FIG. 3 schematically illustrates an enlarged plan view of a portion of an embodiment of a semiconductor device or integrated circuit 110 that is formed on a semiconductor die 111. Controller 40, or alternately controller 101, is formed on die 111. Die 111 may also include other circuits that are not shown in FIG. 4 for simplicity of the drawing. Controller 40 and device or integrated circuit 110 are formed on die 111 by semiconductor manufacturing techniques that are well known to those skilled in the art.

In view of all of the above, it is evident that a novel device and method is disclosed. Included, among other features, is forming a controller to use the value of the AX voltage at approximately the zero crossing of the secondary current to form a feedback signal to use in regulating the output voltage. The value of the feedback signal is also used to form a pseudo signal that is used to determine the zero crossing of the current in the secondary. Using the pseudo signal provides an accurate determination of the secondary voltage. Using the auxiliary voltage at the zero crossing removes the effect of the secondary side rectifier diode and improves the accuracy of the regulation.

While the subject matter of the invention is described with specific preferred embodiments, it is evident that many alternatives and variations will be apparent to those skilled in the semiconductor arts. For example, pseudo signal generator circuit 65 may have various other embodiments such as an analog-to-digital converter. Additionally the storage elements, such as capacitor 86, could be implemented as digital storage elements. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A battery charger comprising:
a switching controller configured to form a switching control signal suitable to control a power switch to control current through a primary inductor of a transformer; and
a pseudo generator circuit configured to receive an auxiliary voltage from an auxiliary winding of the transformer and use the auxiliary voltage to generate a current sense signal that is representative of a value and a waveshape of current flow through a secondary winding of the transformer for a duration of an off-time of the power switch.

2. The battery charger of claim 1 wherein the switching controller and the auxiliary voltage have a common reference.

3. The battery charger of claim 1 further including a sampling circuit configured to sample the auxiliary voltage at a, substantially zero crossing of the current sense signal and form a sampled signal responsively to the current sense signal.

4. The battery charger of claim 3 further including an error amplifier coupled to receive the sampled, signal and form an error signal wherein the switching controller uses the error signal to form the switching control signal.

5. The battery charger of claim 1 further including an, error circuit configured, to receive the auxiliary voltage and form an error signal that is representative of a deviation of an output voltage from a desired value of the output voltage, wherein the pseudo generator circuit is coupled to receive the error signal and store a first signal that is representative of the error signal, and configured to use the auxiliary voltage to decay the stored value of the first signal at a first rate that is representative of a decay rate of the current flow through the secondary winding.

6. The battery charger of claim 1 wherein the pseudo generator circuit decays the current sense signal at a rate that is representative of a decay rate of the current flow through the secondary winding.

7. The battery charger of claim 6 wherein the pseudo generator circuit stores an error signal on first a storage capacitor, charges a second capacitor to a value representative of the error signal stored, on the first storage capacitor, and discharges the second capacitor at a first rate that is representative of a decay rate of the current flow through the secondary winding.

8. The battery charger of claim 1 wherein the pseudo generator circuit includes a first sampling circuit configured to receive a signal representative of the auxiliary voltage and form a first stored signal on a first storage element.

9. The battery charger of claim 8 further including an error amplifier configured to receive the first stored signal and form an error signal representative of a deviation of an output voltage from a desired value of the output voltage.

10. The battery charger of claim 9 further including a second sampling circuit configured to form a second stored signal that is representative of the error signal, sample the second stored signal and form a third stored signal that is representative of the second stored signal, and configured to decay the third stored signal at a rate that is representative of a decay rate of the current flow through the secondary winding.

11. A method of forming a power supply controller comprising:
configuring a switching controller to form a switching control signal suitable to control a power switch to control current through a primary inductor of a transformer to regulate an output voltage on a secondary winding of the transformer;
configuring the power supply controller to receive a sense signal that is representative of an auxiliary voltage from an auxiliary winding of the transformer and form an error signal that is representative of a deviation of the output voltage from a desired value of the output voltage; and
configuring the power supply controller to capture a value of the error signal and form a current sense signal that is representative of a value of and a waveshape of current flow through the secondary winding by using the auxiliary voltage to decay the captured value of the error signal at a first rate that is representative of a decay rate of the current flow through the secondary winding.

12. The method of claim 11 wherein configuring the power supply controller to capture the value of the error signal includes configuring the power supply controller to store the error signal to form a stored signal and to use the auxiliary voltage no decay toe stored signal at the first rate.

13. The method of claim 12 wherein configuring the power supply controller to store the error signal to form the stored signal includes use the auxiliary voltage to form a decay rate of the stored signal.

14. The method of claim 13 wherein the power supply controller is configured to store the error signal on a first capacitor and transfer a value from the first capacitor to a second capacitor responsively to the switching control signal.

15. The method of claim 12 wherein configuring the power supply controller to receive the sense signal that is representative of the auxiliary voltage includes configuring the power supply controller to store a value of the auxiliary voltage responsively to a zero crossing of the stored signal.

16. A method of forming a power supply controller comprising:
configuring a switching controller to form a switching control signal suitable to control a power switch to control current through a primary inductor of a transformer to regulate an output voltage on a secondary winding of the transformer;
configuring the power supply controller
configuring the power supply controller to use an auxiliary voltage from an auxiliary winding of the transformer to store a signal representing a deviation of the output voltage from a desired value of the output voltage;
configuring the power supply controller to form, a current sense signal by using the auxiliary voltage to decay the stored signal to a zero crossing that is substantially the same as a zero crossing of a current through the secondary winding; and
configuring the power supply controller to use the current sense signal to sample the auxiliary voltage and form a first sampled signal.

17. The method of claim 16 wherein configuring the power supply controller includes configuring the switching controller to be referenced to a common voltage to which the auxiliary winding is referenced.

18. The method of claim 16 further including configuring an error amplifier to use the first sampled, signal to form an error signal representing the deviation of the output voltage from a desired value of the output voltage.

19. The method of claim 18 wherein, configuring the error amplifier to use the first sampled signal includes configuring the power supply controller to store the error signal on a capacitor responsively to the switching control signal.

20. The method of claim 16 further including configuring the power supply controller to initiate decay of the current sense signal to substantially zero responsively to the switching control signal.

\* \* \* \* \*